United States Patent Office 2,797,204
Patented June 25, 1957

2,797,204

VULCANIZATION OF BUTADIENE RUBBERS WITH THE REACTION PRODUCT OF FORMALDEHYDE AND 3,4,5-TRIALKYLPHENOL

Alvin F. Shepard, Joseph T. Cardone, and Albert S. Jacobson, Le Roy, N. Y., assignors to Hooker Electrochemical Company, Niagara Falls, N. Y., a corporation of New York No Drawing. Application July 20, 1954,
Serial No. 444,674

8 Claims. (Cl. 260—43)

The present invention relates to the vulcanization of 1,3-butadiene polymers by means of hydroxy-aryl-aldehyde condensation products. More particularly, the present invention relates to a process for obtaining new and useful vulcanized materials which are the reaction products between a butadiene rubber of the aforesaid type and a new class of vulcanizing agents which are the condensation products of substituted phenols with formaldehyde. Additionally, it relates to the resulting products which possess both physical and chemical properties superior in many respects to the products resulting from the vulcanization of butadiene rubbers with the conventional vulcanizing agent, sulfur.

The terms "butadiene rubber(s)" and "1,3-butadiene polymer(s)" as used above and throughout the specification embrace within their scope polymers of 1,3-butadiene, copolymers of 1,3-butadiene, and admixtures of the two. Examples of copolymers of 1,3-butadiene include such synthetic rubbers as GRS and GRN rubbers.

Many attempts have been made to combine the prominent properties of the two classes of materials, the elastomers on one side and the phenolic plastics on the other, in such a way as to produce new materials of outstanding properties. These attempts have ranged all the way from a crude mixture of ground rubber as a filler in the phenolic molding compositions, or ground phenolic material as a filler in the rubber compositions, to the other extreme of forming new chemical compounds by combining representatives of the two classes chemically through a formation of primary valence bonds.

It is well known that, in the rubber industry as well as in the industry producing phenolic condensation products, the art has progressed much faster than the science, and this is even more true for the combination of these two fields, and much confusion exists regarding the interpretation of the phenomena observed when substances of these two classes are mixed or reacted with each other. The most scientific approach towards explanation of the phenomena occurring seems to be contained in two publications, one by van der Meer, "The Vulcanization of Rubber With Phenol - Formaldehyde Derivatives," Naamlooze Vennootschop W. D., Meinema, Delft, and the other by Wildschut, Rec. trav. chim. 61, 898 (1942).

Wildschut investigated among other things the vulcanization of natural rubber by means of condensation products of p-tertiary amyl phenol with formaldehyde. He established the criteria for distinguishing between the results of intermingling the highly polymerized or condensed chains of rubber and resin molecules on one side, from a combination by means of cross-linking between them leading to a true vulcanization on the other. He offered proof of the correctness of his conceptions by investigating the solubility of mixtures of natural rubber on one side, and a paraffin "Oppanol," on the other side, with his resins by subjecting the mixtures to the action of various solvents after heating.

Van der Meer investigated the reaction of natural rubber with the condensation products of numerous phenols with formaldehyde. He interpreted his results mostly on the basis of Wildschut's work and reached conclusions very similar to those of Wildschut.

The conclusions of these two investigators may be summarized as follows:

1. Any mixture of a phenolic condensation product with rubber tends to increase, to a greater or lesser extent, the hardness, and tends to push it in a direction which would appear, on the surface, to approach a vulcanization.

2. A true vulcanization, however, requires the cross-linking of the rubber hydrocarbon chains by means of the condensation products.

3. Such cross-linking can occur only when the phenolic resins have at least two methylol groups per molecule.

4. Not all condensation products having at least two methylol groups will vulcanize rubber.

5. Those that do, will vulcanize rubber in a varying degree, ranging from a hardly perceptible vulcanization toward a vulcanization almost as good as that obtained with the classical rubber vulcanizing agent, sulfur.

6. The difference in the degree of vulcanization obtained is explainable by the difference in the ratios of the rate of reaction between resin-resin on one side and resin-rubber on the other side. In other words, some resins condense with themselves, through their methylol groups, before they have an appreciable chance to react with rubber, resulting in appreciable vulcanization. On the other end of the scale are those resins which have no tendency to condense with themselves, so that they are completely available for cross-linking the rubber molecules, resulting in a high degree of vulcanization.

The scientific work of Wildschut and van der Meer has found much attention in the rubber industry and their experiments have been repeated and extended in many industrial laboratories. The results of these experiments have not, however, led to any important industrial use, mainly because the phenols tested by them, comprising practically all of the phenols industrially available at that time, did not offer any technical or economical advantage over the customary vulcanizing agents such as sulfur derivatives. Furthermore, the experiments referred, with the exception of a few experiments done with synthetic rubbers by Wildschut, almost exclusively to the vulcanization of natural rubber. The physical properties of natural rubber vulcanized with sulfur or sulfur derivatives are such that major improvements can hardly be expected from the use of condensation products instead of sulfur.

In accordance with the foregoing statement, if it were possible to generalize from the teaching of Wildschut and van der Meer, who were interested in the vulcanization of natural rubber, and to apply their teaching to the vulcanization of butadiene rubbers, it would not be expected that the properties of the resultant products would in many cases be superior to the properties of a butadiene rubber vulcanized with the conventional vulcanizing agent, sulfur.

It is, however, an object of the present invention to improve the physical and chemical properties of butadiene rubbers by vulcanizing them with hydroxy-aryl-formaldehyde condensation products.

A further object of the present invention is to provide a vulcanized butadiene rubber and a process for producing the same, which vulcanized product possesses physical and chemical properties superior to those obtained with the customary vulcanization agents normally employed for vulcanizing butadiene rubbers.

A further object of the present invention is to improve the physical and chemical properties of the elastomers of the butadiene rubbers by vulcanization by means of hydroxyaryl-formaldehyde condensation products, alone or in combination with the customary vulcanizing agents, over and above the range of physical and chemical properties obtainable with the customary vulcanizing agents alone.

These and other objects will become more apparent upon considering the description of the present invention as set forth hereinafter.

In accordance with the present invention, we have discovered that when certain condensation products of certain substituted phenols with formaldehyde are intimately admixed with the polymers of 1,3-butadiene, copolymers of 1,3-butadiene or admixtures of the same and subjected to elevated temperature conditions, the resultant products possess physical and chemical properties superior to those obtainable with the customary vulcanizing agents. This invention involves a number of unexpected findings:

1. It was found that the physical and chemical properties of butadiene rubbers can be improved over and above those obtained with any of the customary vulcanizing agents, an observation which could not be expected from the facts published by Wildschut and van der Meer who succeeded in vulcanizing natural rubber to a considerable extent, but never so far as to make the obtained products superior to those resulting from the use of sulfur as the vulcanizing agent.

2. The few generalizations which evolved from the work of van der Meer and Wildschut and other technical observers, as a result of work with natural rubber, were not found applicable to the vulcanization of butadiene rubbers. Both Wildschut and van der Meer emphasized in their publications that phenols having only two active positions, the formaldehyde derivatives of which therefore can not cure to the insoluble and infusible condition, are preferable to phenols having three active positions. The theoretical explanation given for this fact is that phenols, having only two active positions, are less liable to react with themselves instead of with the rubber than are phenols having three active positions. The latter have a great tendency to form a cross-linked network of molecules instead of, but without having connection with, the rubber. A former technical observer, Hönel, advances a theory in U. S. Patent 2,165,380 which is just the opposite. He recommends condensation products of phenol and formaldehyde which are hardenable to the insoluble and infusible state, for mixture with high molecular substances including natural rubber to obtain homogeneous products. But according to the present invention and the invention disclosed in our pending application Serial No. 420,747, filed April 2, 1954, butadiene rubbers can be vulcanized with resins derived from phenols having either two or three unsubstituted active positions. Contrary to Wildschut's and van der Meer's teaching, for example, the dimethylol derivative of 3,5-xylenol is an excellent vulcanizing agent for GRS and contrary to Hönel's teaching, the dimethylol derivative of 2-t-butyl-5-methylphenol is an excellent vulcanizing agent for GRS.

3. Hönel taught that the suitability of condensation products as additives to high molecular substances depends mostly on the number of carbon atoms in their side chains. According to him, a minimum of four in certain cases, but, in general, five carbon atoms is required to make the resins suitable for mixing with rubber-like substances. This observation was found to be incorrect. The 3,4,5-trimethylphenol derivatives having only three carbon atoms in the side chains, make excellent vulcanizing agents for GRS rubber.

4. Hönel advanced the theory that compatibility of resins with high molecular substances is identical with their ability to react with them, which latter ability is identical with their ability to cross-link them. Hönel overlooked that this teaching tries to wipe out the obvious differences of three obviously distinct steps in the behaviors of two substances toward each other. Substances are compatible with each other if their chemical and physical properties are sufficiently alike. No chemical combination between them is necessary and similarity in their physical and chemical properties militates normally against a chemical combination. An example of purely physical compatibility can be found, for instance, in the mixture of petroleum oil with GRS compositions. The next step would be a chemical combination between different substances held together with one chemical main valence bond. An example of the combination of this type is, the combination of hydrogen with rubber to form a hydrogenated rubber, which is certainly a true chemical compound, but which does not produce vulcanization. Vulcanization is the third step in which one molecule of the vulcanizing agent and two molecules of the rubber combine chemically, resulting in a cross-linking of the rubber chains.

A great number of exceptions to the rule laid down by Hönel were found. Condensation products of m-pentadecylphenol are excellently compatible with GRS rubber mixtures, but fail to vulcanize them. The dimethylol compound of 3,5-xylenol, for instance, is imperfectly compatible with GRS rubber, but nevertheless gives a vulcanized GRS of high quality. Hönel further teaches that reactivity with rubber is the greater, the smaller the molecule is. This teaching too does not hold true for GRS rubber mixtures. A high molecular resin prepared from tertiary amyl phenol, having a molecular weight of approximately 1000, is a better vulcanizing agent than the corresponding dialcohol having a molecular weight of 210.

Hönel's patent covers an almost infinite number of high molecular substances including allegedly all types of rubbers both natural and synthetic, and an infinite number of phenol-aldehyde condensation products. It is surprising, with an infinite number of combinations possible, he should not have found a single case in which true vulcanization of a butadiene rubber with a phenol-formaldehyde condensation product occurred, but actually such is the case. He investigated several rubber-phenolic condensation product mixtures and he observed the usual influence of the resin upon the physical and chemical properties of the rubber. Specifically, he observed that natural rubber, vulcanized in the presence of certain resins, gave properties superior to rubber vulcanized in the same way in the absence of such resins, but he never observed explicitly that certain resins actually do vulcanize rubber. The closest he comes to making this observation is in the latter part of Example No. 7, wherein he mixes the formaldehyde condensation product of 3-methyl-5-isopropylphenol with natural rubber, a vulcanizing agent, filler, etc., and observes that the product has a higher tensile strength than a product obtained from the same starting materials without the resin. Whether in this case he obtained true vulcanization of the natural rubber by means of this particular resin appears doubtful. Van der Meer states in his book on page 15, last line, and on page 16, lines 1 to 7, "Hönel indicated that it is possible in some instances to vulcanize rubber by means of a resol but he indicated also that in these cases too, the addition of the customary vulcanizing agent such as sulfur is preferable. From his investigation it is not apparent whether or not one can speak of a chemical reaction between rubber and resol." Van der Meer referring to Hönel's method states further on page 61, lines 2 to 6 from the top: "It is true that the products obtained by this method were of such a nature that Hönel himself indicated that the omission of the ordinary vulcanizing agent is far from desirable . . ." Even if a true vulcanization had taken place in this case, it is obvious that Hönel did not observe it, because first, if he had observed it, he would not have indicated it by a few chance words toward the end of an example without any further reference to it, and second, if he had actually left the vulcanizing agent out, he would not have been able to compare results of the addition of the resin with those in which the resin had been left out, because in the latter case with no vulcanizing agent in it he would not have obtained a vulcanized product at all.

Specifically, in accordance with the present invention, we have discovered that 1,3-butadiene polymers, 1,3-butadiene copolymers and admixtures thereof may be vulcanized with a vulcanizing agent which is the reaction product of at least 1.2 mol of formaldehyde per mol of phenol of the general formula:

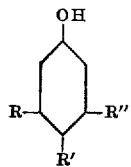

wherein R, R' and R" are saturated substituents of aliphatic nature.

As will be shown hereinafter, the vulcanized materials of the present invention as produced in accordance with the process of the present invention obtain chemical and physical properties which exceed those obtainable when vulcanizing butadiene rubbers with the use of conventional vulcanizing agents.

Phenols represented by the general formula:

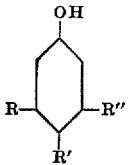

wherein R, R' and R" are saturated substituents of aliphatic nature may be exemplified by 3,4,5-trimethylphenol and 3,5-dimethyl-4-isopropylphenol.

The vulcanizing agents of the present invention are in general prepared by reacting an excess of formaldehyde with phenol, i. e., at least 1.2 mol of formaldehyde per mol of phenol, in the presence of an alkaline catalyst such as sodium hydroxide at temperatures up to the boiling point of the reaction mixture for a period of time which is selected in accordance with the particular average molecular weight desired. Specific examples presented hereinafter will illustrate time factors required for the particular temperature employed in order to obtain reaction products of suitable molecular weight. Upon completion of the reaction, the product may be dehydrated and used as such, or it may be neutralized with a weak acid such as acetic acid, washed with water to remove salts, and dried. The molecular weight, melting point and other properties of the product may be modified by heating it so as to split off either water alone or water and formaldehyde.

The above methods of producing the vulcanizing agents of the present invention may be advantageously modified in order to obtain mononuclear dialcohols. In general, the modification comprises utilizing Methyl Formcel (a product of the Celanese Corporation which is a 40% solution of formaldehyde in methanol). Specific details of satisfactory methods for obtaining individual mononuclear dialcohols are presented in the examples hereinafter.

The chemical significance of the method of producing these vulcanizing resins, the limitation in their composition, and their ability to vulcanize may be explained according to the work of authors like Zinke and others [Carswell, T. S., "Phenoplasts" (pgs. 20–24), Interscience Publishers, Inc., New York, 1947], by the following theory. It should be understood here that we do not want to be limited, however, by this theory, but offer it only as a possible explanation for the facts which constitute this invention.

Resins having the ability to vulcanize rubber, according to the present invention, must have, according to this theory, at least two active groups per molecule.

Active groups may be of two types. One is the methylol group such as occurs, for instance, in the dialcohol,

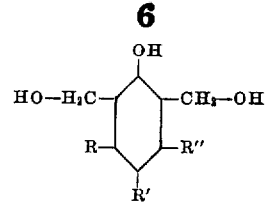

in the dinuclear compound,

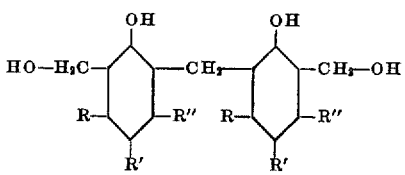

or in equivalent structures.

The second type of active group is the methylene ether group, formed by splitting off water between any two methylol groups of adjacent molecules of the compounds above.

Our observations can be interpreted as indicating that, during the process of vulcanization, each methylene ether group effects vulcanization to a degree equivalent to two methylol groups.

The active groups can be attached to one phenolic nucleus, as in the case of the dialcohol, or they can be attached at various points to molecules containing connected phenolic nuclei. Compounds containing less than 1.2 mols of formaldehyde per mol of phenol have either an insufficient concentration of active groups or contain the active groups at too great a distance from each other to permit an efficient vulcanization of rubber, as disclosed by the present invention.

The reaction products prepared according to this invention need not contain either methylene or methylene-ether linkages exclusively to connect the phenolic nuclei. When the products are prepared commercially, without any special precautions taken to limit the structure to either one type or the other, they will generally contain linkages of both the methylene and methylene-ether types.

It has been found that satisfactory vulcanizing action is obtained only when the molecular ratio of formaldehyde to the phenol is at least 1.2:1. Optimum results have been obtained with the particular compound shown in the table below when reaction products having a ratio of about 2:1 are used. When reaction products utilizing other tri-substituted phenols are used, optimum results may be obtained when a formaldehyde to phenol ratio other than 2:1 is used. However, in all cases the value must lie in the range of 1.2:1 and 2:1. The table shows that comparable results may be obtained with either the dialcohol or the further condensed resin as long as the molecular ratios of formaldehyde to phenol are kept at about 2:1. This leads to the conclusion that the formaldehyde to phenol ratio and not the degree of condensation is the determining factor of vulcanizing ability. The high ratio of 2:1 obtainable in the condensed resin produced from a trisubstituted phenol is indicative of the presence of a methylene-ether-linked structure within the molecule.

The data set forth in the table below was obtained with reaction products of formaldehyde and 3,5-dimethyl-4-isopropylphenol by employing them as curing agents for a GRS-carbon black rubber comprising approximately 66 parts by weight of GRS rubber and 33 parts by weight of carbon black. In all cases 10% by weight of curing agent was intimately admixed with carbon black-GRS rubber, and the mixture cured under pressure for a maximum of one hour at a temperature ranging between 163° and 168° C.

| Condensation Product | Molecular Ratio of Formaldehyde to Phenol | Mol. Wt. | Melting Point, °C. | Tensile Strength of Vulcanized Rubber at Op. Cure, p. s. i. |
|---|---|---|---|---|
| Dialcohol | 2:1 | 224 | 108 | 3,790 |
| Resin | 1.98:1 | 950 | 110–120 | 3,890 |

Contrary to the teaching of Honel, we have discovered that, at least in so far as vulcanizing action is concerned, the reaction products of the present invention need not be resols. A resol as defined by Carleton Ellis in "The Chemistry of Synthetic Resins" (Reinhold Publishing Corp., New York, N. Y., 1935), page 335, is "a resin of the type hardenable by heat to a final insoluble and infusible condition, but reacted only to the stage where it still melts when heated. . ." In order to be capable of forming a resol, as defined above, the phenol must have the reactive positions i. e. 2, 4 and 6 positions, free of substituents. The phenols of the present invention all contain substituents in the 4 position. Such phenolic compounds, therefore, do not yield resols when reacted with formaldehyde, but have nevertheless been determined, in accordance with the present invention, to be excellent vulcanizing agents. The point here made is, therefore, that, contrary to the teaching of Honel, the vulcanizing agents of the present invention need not be resols, but instead may be non-resols. Thus, Honel's findings as set forth in U. S. Patent 2,165,380 are not applicable to the vulcanization of butadiene rubbers in that he attempted to generalize by using the term "compatability" with high molecular substances when the only actual rubber experimented with was a natural rubber, he overlooked the importance of the molecular ratio of formaldehyde to phenol and he failed to realize that non-resols could be excellent vulcanizers of rubber.

In general, polymers of butadiene, copolymers of butadiene and admixtures of polymers and copolymers of butadiene may be vulcanized in accordance with the present invention by intimately admixing a relatively small percentage by weight of the selected vulcanizing agent of the present invention in the rubber to be vulcanized and subjecting the resultant admixture to elevated temperature conditions. As in the case of vulcanizing butadiene rubbers with sulfur, to obtain the maximum tensile strength characteristics of the products of the present invention necessitates the inclusion of a reinforcing filler. Among the many reinforcing fillers, carbon black made by the channel process is considered the most outstanding one. However, suitable reinforcing fillers include furnace-type carbon blacks, soft gas blacks, zinc oxide, magnesium carbonate, calcium silicate, whiting, hard clays, silica, et cetera.

The physical properties of polymers of butadiene, copolymers of butadiene and admixtures of the same vary from those which are relatively tough and nervy such as GRN to those which are relatively more soft and easily workable such as GRS compositions which are specifically designed for easy workability. Thus the selection of any particular butadiene rubber will dictate the degree of breakdown necessary. Temperature becomes a more increasingly important factor generally as the degree of breakdown necessary increases. The conventional Banbury mixer or other rubber compounding machines are suitably equipped for controlling the temperature of breakdown.

Upon completion of the breakdown period, fillers if not previously incorporated are added as are pigments, plasticizers, anti-oxidants, et cetera. In general, where the temperature of breakdown is high, it may prove desirable to add the vulcanizing agents of the present invention after the addition of the other agents. Such an order of addition may serve to eliminate premature vulcanization. In conventional synethetic rubber compounding, it is the usual practice to use sulfur as the vulcanizing agent. To promote the vulcanizing action of sulfur, it is customary to add an organic accelerator such as, for example, "Santocure," which is said to be N-cyclohexyl-2-benzothiazylsulfonemide and is manufactured by Monsanto Chemical Company. An inorganic accelerator such as zinc oxide is also included. Then, to activate the zinc oxide in such a way that it will accelerate sulfur vulcanization, it is desirable to add a fatty acid such as stearic acid. Furthermore, since the synthetic rubbers do not break down readily in processing, it is difficult to incorporate the aforesaid compounding agents in the rubber, and, consequently, it is general practice to add a softener such as a hydrocarbon oil to improve processing. Finally, since sulfur vulcanizates tend to degrade under the action of heat and oxygen, age-resistors such as "BLE" are added. "BLE" is an amine reaction product in the form of a non-volatile amber-colored liquid with a specific gravity of 1.087 which is manufactured by the Naugatuck Chemical Division, U. S. Rubber Company.

The vulcanizing agents of the present invention have a four-fold function. First, they act as plasticizing agents. In ordinary processing when sulfur is used as the vulcanizing agent, it is customary to add, in addition to the sulfur, one of the common plasticizing agents to soften up the rubber to the point where it can be easily worked. After the processing, the plasticizer remains in the rubber as a foreign substance, in many cases imparting undesirable properties to the rubber. However, when the resins of the present invention are used, they act as plasticizing agents, allowing the rubber to be worked in the absence of additional plasticizing agents. Then, after they have served their purpose as plasticizing agents, they enter into the vulcanizing process, so that there are no plasticizing agents left in the finished product as foreign substances.

Second, they eliminate the need for the agents described above. Third, they serve as vulcanizing agents. Finally, they serve as antioxidants, protecting the ultimate product from the action of heat and oxygen. The antioxidants and accelerators may, however, be added in the conventional manner when it is desired to enhance the specific properties over and above that degree obtainable by the use of the resin alone, but the advantage of the use of the resin is still manifested inasmuch as a smaller amount of these agents may be used when used in conjunction with the resin.

Selection of the amount of vulcanizing agent in accordance with the present invention is governed by the characteristics of the product desired as well as the selection of the particular butadiene polymer, copolymer, or admixture of the same. Where it is desirable that the characteristics of the butadiene rubber predominate in the resulting product, it is advisable to employ minimum quantities of the vulcanizing agents of the present invention. For example, a composition including 2% by weight of a vulcanizing agent of the present invention when vulcanized has exceptionally good tensile strength. An increase of the percentage composition by weight of the vulcanizing agent increases the hardness and the elastic modulus while decreasing the percent elongation of the product. Increasing the phenolic resin content to, for example, 30%, will obtain a product of greater hardness, greater elastic modulus, lower percent elongation, greater heat resistance and improved surface finish. From the foregoing, it will be apparent many factors govern the selection of the amount of vulcanizing agent to be incorporated in the butadiene rubber prior to vulcanization. Examples presented hereinafter will illustrate some of the variations of properties obtainable by a choice of varied amounts of vulcanizing agents.

The products of the present invention exhibit high tensile strength, in many cases almost 4,000 pounds per square inch, high elongation, and excellent solvent resistance to such solvents as benzene, toluene, carbon tetrachloride etc. Unlike sulfur vulcanizates, they show no tendency to bloom and they are highly resistant to change in mechanical and electrical properties on heat aging.

The following examples serve to illustrate embodiments of the invention. In each example the rubber used was GRS 1601-0, which is a mixture of roughly 100 parts of a butadiene-styrene copolymer with about 50 parts of carbon black. In each example vulcanization was accomplished solely by the use of the phenolic condensation product listed. However, sulfur may be added to the stated mixture to obtain modified properties. No other materials were used in these examples than those expressly set forth.

Example I

One mol of 3, 4, 5-trimethylphenol was reacted with an excess of formaldehyde (10 mols, added as a 40% methanolic solution) in the presence of 1 mol of potassium hydroxide (57% aqueous). The reaction was complete after 30 hours during which time two mols of formaldehyde had been consumed. The reaction mixture was diluted with water and neutralized with Dry Ice. Sufficient sodium m-bisulfite was added to remove the unreacted formaldehyde from the solution. When the solution was acidified with dilute hydrochloric acid to a pH of 5, crystals separated. The crystals were further purified by recrystallization. The crystals of 2,6-dimethylol-3,4,5-trimethylphenol thus produced were milled thoroughly with GRS 1601-0 rubber, the percentage of dimethylol compound used being 10% based on the rubber. The mixture was cured at 165° C. for 75 minutes. The vulcanized product had a tensile strength of 3950 lbs./in.² and an elongation of 740%.

Example II

A new phenol, 3,5-dimethyl-4-isopropylphenol, was prepared by the propylation of 3,5-xylenol in the presence of sulfuric acid catalyst in the following manner:

One mol of isopropyl alcohol was added slowly to a mixture of 1 mol of 3,5-xylenol in 2 mols of sulfuric acid (70% aqueous) at 73-95° C. After 1½ hours at 95° C., the reaction mixture was cooled and an organic layer which separated was removed and washed thoroughly with water. Fractional distillation in vacuo at 120-122° C. under a pressure of 10 mm. of mercury yielded 3,5-dimethyl-4-isopropylphenol. The product after recrystallization from petroleum ether had a melting point of 107-108.5° C. uncorrected. Upon analysis, the compound was found to contain carbon, 80.87% and 80.79%; and hydrogen 9.86% and 9.75%. The theoretical values calculated for the formula $C_{11}H_{16}O$ are: Carbon 80.54% and hydrogen 9.79%.

(A) One mol of the 3,5-dimethyl-4-isopropylphenol formed above was reacted with 5 mols of formaldehyde (40% methanolic solution) in the presence of 0.85 mol of sodium hydroxide at 25° C. for 27 hours. At the end of that period, the excess formaldehyde was removed by adding sodium sulfite solution. When the solution was neutralized with dilute hydrochloric acid, a crystalline material was precipitated which, after successive recrystallizations from benzene and aqueous methanol, had a melting point of 107.5-108.5° C. Analyses of the crystalline product showed compositions of 69.74% and 69.90% carbon and 9.15% and 9.02% hydrogen. The theoretical composition of 2,6-dimethylol-3,5-dimethyl-4-isopropylphenol is 69.61% carbon and 8.99% hydrogen.

Ten percent by weight of this compound was milled into GRS 1601-0 rubber and cured at 165° C. for 1¼ hours. The vulcanized rubber had a tensile strength of 4070 lbs./in.² and 640% elongation. Another mixture was prepared by milling together 5 parts by weight of the dimethylol compound, 100 parts by weight GRS 1601-0 and 5 parts by weight ZnO. The mixture was then cured at 165° C. for 2 hours. The resulting vulcanizate had a tensile strength of 3460 lbs./in.² and an elongation of 600%.

(B) A resinous product of 3,5-dimethyl-4-isopropylphenol and formaldehyde was prepared by heating 2,6-dimethylol-3,5-dimethyl-4-isopropylphenol. When held at 130° C. for 30 min., the dimethylol compound lost 82 mol percent water and formed a clear yellow friable resin that melted at 110-120° C. This resin had an average molecular weight of 960, as determined cryoscopically in dioxane solvent. A condensation product containing 4 phenolic nuclei would theoretically have a molecular weight of 842; 5 nuclei would have a molecular weight of 1048. This resin was thus composed of multi-nuclear molecules containing a varying number of nuclei per molecule, the average having a value of between 4 and 5 nuclei per molecule.

A sample of GRS rubber, type 1601-0, containing 5% by weight of this resin was cured at 165° C. for 2 hours. The vulcanized rubber had a tensile strength of 3630 lbs./in.² and an elongation of 560%. With 10% resin added, the rubber cured to a tensile strength of 4150 lbs./in.² and an elongation of 530% in 1¼ hours.

We claim:

1. A vulcanized material comprising the reaction product between a 1,3-butadiene polymer and a vulcanizing agent which is the reaction product of at least 1.2 mol of formaldehyde per mol of phenol of the general formula:

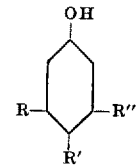

wherein R, R' and R" are alkyl groups.

2. A vulcanized material comprising the reaction product between a 1,3-butadiene polymer and a vulcanizing agent which is the reaction product of at least 1.2 mol of formaldehyde per mol of phenol selected from the group consisting of 3,4,5-trimethylphenol and 3,5-dimethyl-4-isopropyl phenol.

3. A vulcanized material comprising the reaction product between a 1,3-butadiene polymer and a vulcanizing agent which is the reaction product of at least 1.2 mol of formaldehyde per mol of 3,4,5-trimethylphenol.

4. A vulcanized material comprising the reaction product between a 1,3-butadiene polymer and a vulcanizing agent which is the reaction product of at least 1.2 mol of formaldehyde per mol of 3,5-dimethyl-4-isopropylphenol.

5. A method of vulcanizing a 1,3-butadiene polymer which comprises the steps of intimately admixing in the polymer a vulcanizing agent which is the reaction product of at least 1.2 mol of formaldehyde per mol of a phenol of the general formula:

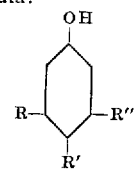

wherein R, R' and R" are alkyl groups, and subjecting the resulting admixture to an elevated temperature.

6. A method of vulcanizing a 1,3-butadiene polymer which comprises the steps of intimately admixing in the polymer a vulcanizing agent which is the reaction product of at least 1.2 mol of formaldehyde per mol of phenol selected from the group consisting of 3,4,5-trimethylphenol and 3,5-dimethyl-4-isopropylphenol, and subjecting the resulting admixture to an elevated temperature.

7. A method of vulcanizing a 1,3-butadiene polymer which comprises the steps of intimately admixing in the polymer a vulcanizing agent which is the reaction product of at least 1.2 mol of formaldehyde per mol of 3,4,5-trimethylphenol, and subjecting the resulting admixture to an elevated temperature.

8. The method of vulcanizing a 1,3-butadiene polymer which comprises the steps of intimately admixing in the polymer a vulcanizing agent which is the reaction product of at least 1.2 mol of formaldehyde per mol of 3,5-dimethyl-4-isopropylphenol, and subjecting the resulting admixture to an elevated temperature.

References Cited in the file of this patent

UNITED STATES PATENTS

| | | |
|---|---|---|
| 2,165,380 | Hönel | July 11, 1939 |
| 2,649,431 | Little | Aug. 18, 1953 |

UNITED STATES PATENT OFFICE

CERTIFICATE OF CORRECTION

Patent No. 2,797,204 June 25, 1957

Alvin F. Shepard et al.

It is hereby certified that error appears in the printed specification of the above numbered patent requiring correction and that the said Letters Patent should read as corrected below.

Column 2, line 28, for "appreciable" read -- inappreciable --; line 42, after "sulfur" insert -- and sulfur --.

Signed and sealed this 22nd day of October 1957.

(SEAL)
Attest:

KARL H. AXLINE
Attesting Officer

ROBERT C. WATSON
Commissioner of Patents